United States Patent
Kano

[11] 3,897,138
[45] July 29, 1975

[54] PROJECTION LENS FOR MASK PATTERN PRINTING

[75] Inventor: Ichiro Kano, Yokohama, Japan

[73] Assignee: Canon Kabushiki Kaisha, Japan

[22] Filed: Aug. 16, 1974

[21] Appl. No.: 498,286

Related U.S. Application Data

[63] Continuation of Ser. No. 307,389, Nov. 17, 1972, abandoned.

[30] Foreign Application Priority Data

Nov. 24, 1971   Japan.............................. 46-93709

[52] U.S. Cl. ................. 350/183; 350/214; 350/216
[51] Int. Cl........................ G02b 9/64; G02b 13/24
[58] Field of Search ........... 350/183, 214, 215, 216

[56] References Cited
UNITED STATES PATENTS

| | | | |
|---|---|---|---|
| 3,588,228 | 6/1971 | Wikczynski et al............. | 350/183 X |
| 3,685,884 | 8/1972 | Harada .............................. | 350/214 |
| 3,733,115 | 5/1973 | Cox..................................... | 350/214 |

*Primary Examiner*—John K. Corbin
*Attorney, Agent, or Firm*—McGlew and Tuttle

[57] ABSTRACT

A projection lens for mask pattern printing comprising a photographic lens arrangement which is used for both the alignment and the printing. The arrangement includes a plurality of fixedly positioned lenses and two interchangeable lens elements which are interchangeably insertable into the arrangement. One interchangeable lens element is designed for the alignment, and is inserted into the arrangement during aligning, and the other interchangeable lens element is designed for the printing, and is inserted into the arrangement during the printing.

7 Claims, 12 Drawing Figures

Spherical aberration (at alignment)

Spherical aberration (at printing)

Astigmatism (at alignment)

Astigmatism (at printing)

PROJECTION LENS FOR MASK PATTERN PRINTING

This is a continuation of application Ser. No. 307,389 filed Nov. 17, 1972, now abandoned.

FIELD AND BACKGROUND OF THE INVENTION

This invention relates to a projection lens suited for use with apparatus using light of different wave lengths as seen in the process for producing IC (integrated circuits) by printing patterns of photo-masks on a silicon substrate wherein the wave length of the ray used for printing is different from that used for viewing the projected image.

In the process for producing IC, there is a step in which desired parts of the oxide layer formed on the silicon substrate are removed in order to diffuse impurities into the interior of the silicon substrate therefrom. The removal of the desired parts of the oxide layer is achieved by photoetching after a pattern corresponding to the desired parts has been printed through the photomask on a photo-sensitive coating (photoresist) applied on the substrate, and which can be made soluble or insoluble in the etching solution by irradiation of rays of light. A number of printing followed by etching cycles are superimposingly applied on a piece of IC with replacing of one mask by another, whereby the mask pattern which has been already printed and the next mask pattern which is to be printed should be precisely positioned relative to each other. This adjustment of the positions relative each other is termed "alignment," which is usually performed with viewing through a microscope.

The photoresist is generally sensitive to light of short wave lengths, while it is insensitive to light of long wave lengths. Speaking in terms of the spectrum of a mercury-arc lamp, which is usually used as a source of light for the printing, the photoresist is sensitive to the 365, 405 and 436 nm. lines, but insensitive to the 456 and 578 nm. lines.

In case printing is carried out by projection, it is usual to perform the alignment by use of the rays of light passing through the projection lens, so that the chromatic aberrations of the projection lens should be corrected for each of the wave lengths of both the alignment light and the printing light. If the axial chromatic aberration is present, the image position of the mask pattern is shifted in the direction of the optical axis by an interchange of rays of light between the alignment and the printing, so that each time the alignment operation is changed over to the printing operation, there arises the difficulty that the mask or the substrate must be moved over again or shifted so as to be in focus. On the other hand, the presence of lateral chromatic aberration leads to an unfavorable result that, even if the alignment made by viewing is perfect, the printing will be made out of alignment.

BRIEF DESCRIPTION OF THE DRAWINGS

The present invention will be described in detail referring to the attached drawings.

DESCRIPTION OF THE PREFERRED EMBODIMENTS

Figure 1:
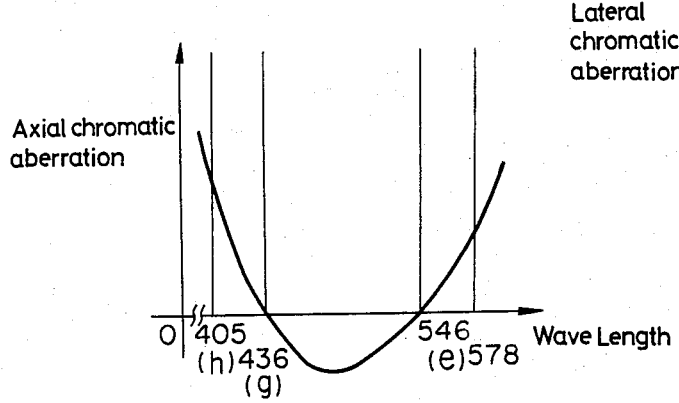
FIG. 1 and FIG. 2 are graphs illustrating states of correction of the chromatic aberrations of the lens of which the chromatic aberrations are corrected for wave lengths 436 nm. and 546 nm. limited for use as the printing light and alignment light respectively.
Figure 2:
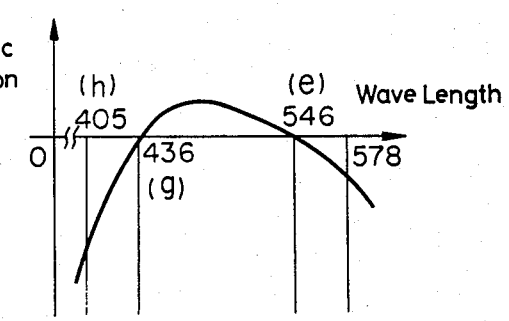

FIG. 1 is a graph illustrating a state of correction of the axial chromatic aberration wherein the printing ray is limited to the 436 nm. line, and the alignment ray to the 546 nm. line. FIG. 2 is a graph illustrating a state of correction of the lateral chromatic aberration in the same case as the above. In this state, although the chromatic aberrations for the 436 and 546 nm. lines are certainly removed, the slopes of the chromatic aberration curves near the 436 and 546 nm. lines are so great that the chromatic aberrations increase sharply as the wave length varies from these values. Therefore, such lens system does not permit to utilize the 405 nm. line as the printing light together with the 436 nm. line, and also it does not permit to utilize the 578 nm. line as the alignment light together with the 546 nm. line, thus having such disadvantages that the efficiency of a source of light is low, a long exposure time is required for the printing, and the alignment is made by viewing under unfavorable conditions.

If a projection lens can be so designed that the chromatic aberrations are corrected for at least three wave lengths among the wave lengths 405, 436, 546 and 578 nm., the above-mentioned disadvantages will be largely overcome. But such correction of the chromatic aberrations is difficult to be made by using the usual technique. Nevertheless, the present invention makes it possible to achieve the same purpose by the interchange of one lens element of the lens system with another between the printing and the alignment.

Figure 3A:
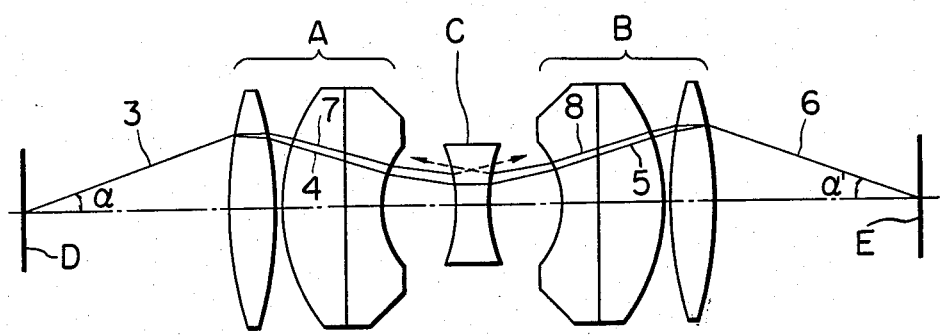
FIGS. 3(a)(b) are lens diagrams illustrating the principle of the lens of the present invention.
Figure 3B:
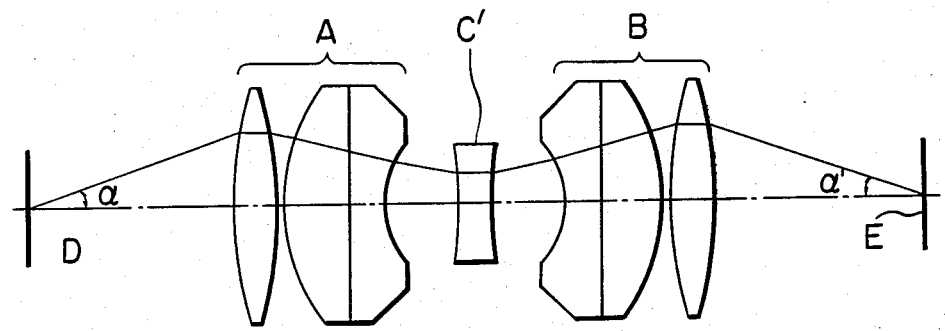
Figure 4:
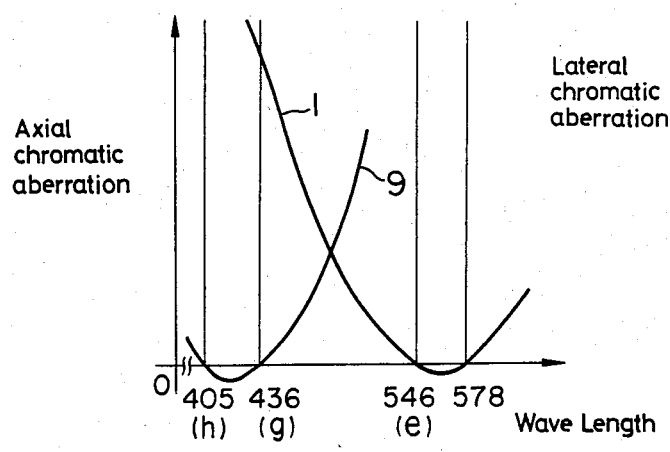
FIG. 4 and FIG. 5 are graphs illustrating states of correction of the chromatic aberrations of a lens embodying the present invention.

FIGS. 3(a)(b) show an example of the lens diagrams illustrating the principle of the present invention wherein FIG. 3 (a) shows a diagram occurring at the time of the alignment, and FIG. 3 (b) shows a diagram occurring at the time of the printing. The entire lens system is of the symmetric type, of which the front lens group (A) and the rear lens group (B) are common to both the alignment and the printing, but the central lens elements (C) and (C') are interchanged with one another. (D) designates the photomask plane, and (E) the substrate plane. In case a mercury-arc lamp is used as a source of light, for example, the chromatic aberrations of the lens system, constructed as shown in the diagram FIG. 3 (a) for the alignment, should be corrected for the 456 nm. and 578 nm lines. This correction of the chromatic aberration is easily made by the usual correction technique. The curve (1) of FIG. 4 is an axial chromatic aberration curve showing a state of such correction, and in FIG. 5 curve (2) shows the corresponding lateral chromatic aberration. FIG. 3(a) now, will be further explained, wherein (3) designates a paraxial ray emanating from the mask plane (D) at an angle α with respect to the optical axis, of which the rays of the 436 and 578 nm. lines, for use as the alignment light, pass through a path of rays (3) (4) (5) (6) and impinge on substrate plane (E) at an angle α' with respect to the optical axis to form an image at a magnification of α/α' thereon. As for the printing light of wave lengths 405 and 436 nm. impinging on the lens having the same construction as shown in FIG. 3 (a), the rays of light (3) pass through a path of rays (7) different from that of the alignment light, so that the passage as well as the position and magnification are different from those of the alignment light. In FIG. 3(a), (8) designates a path of rays under the supposition that the printing light of the 405 and 436 nm. lines is projected in the opposite direction from the substrate plane to the lens at an angle of $\alpha'$ with respect to the optical axis. This path of rays crosses, at the central concave lens (C), the path of rays (3)(7) emanating from the mask plate (D). In order to effect the same magnification in the images of the printing light as well as of the alignment light while fixing the image and substrate planes, the imaging path of rays for the printing light should pass through (3)(7)(8)(6). This can be achieved by using another central concave lens having suitable refractive power, refractive indices and dispersions of the used glasses, radii of curvature of the cemented surfaces, and thicknesses of the lens elements, all values being different from those of the former lens. FIG. 3(b) shows the path of rays of this case. The axial chromatic aberration curve of this lens construction for the printing light of 405 and 436 nm. lines is shown by curve (9) of FIG. 4, and the lateral chromatic aberration curve is shown by curve (10) of FIG. 5.

Figure 5:
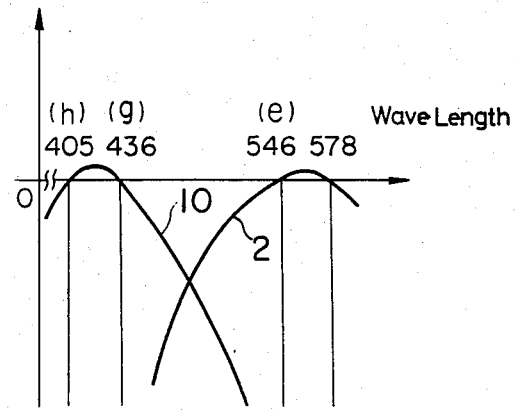

In designing the lens, the axial chromatic aberration for the printing light is positive in the lens arrangement for the alignment as is evident from the chromatic aberration curves shown in FIGS. 4 and 5, so that the negative refractive power of the concave lens (C') for the printing with respect to the printing light should be weaker than the negative refractive power of the concave lens for the alignment with respect to the printing light. For the correction of the chromatic aberration for the printing light of two wave lengths 405 and 436 nm., the dispersion of the glass of the concave lens for the printing should be smaller than that of the concave lens for the alignment. Instead of controlling the dispersion of the glass, the concave lens may be constructed with a number of cemented lens elements whereby the radii of curvature of the cemented surfaces are controlled so as to effect a dispersion equivalent to the controlled dispersion of the glass. As for the field curvature, it is over-corrected for the printing light more than for the alignment light, but the over-correction of the field curvature can be compensated to some extent by making the refractive index of the concave lens for the printing larger than that of the concave lens for the alignment. The astigmatism caused by the use of the concave lens for the printing differs from that caused by the use of the concave lens for the alignment, but the difference will be made up to some extent by making a difference between the thicknesses of the two concave lenses.

The interchange between such central concave lenses can be easily performed, because the entire lens system is of the symmetric type, and because the central concave lens elements are far smaller than the other lens elements. In particular the apparatus to which this lens system is applied has filters which are to be interchanged and an alignment scope, that is, a microscope for alignment observation which is to be set on and off between the printing and alignment operations, so that the central lens can be advantageously interchanged in an interlocking relationship therewith.

The above-mentioned projection lens of the present invention can utilize effectively the spectrum of a light source, so that not only the exposure time necessary for printing can be reduced, but also the deterioration of the image due to the standing wave produced within the photoresist layer, as seen in the printing with a monochromatic rays of light, can be prevented to some extent. Further the chromatic aberration does not vary sharply with the wave length, so that even if the lines of the spectrum of a light source are diffused, a clear image can be printed. Namely, the slopes of the chromatic aberration curves of a conventional projection lens as shown in FIGS. 1 and 2 are so great that, although the aberration for the 436 and 546 nm. lines is corrected in the best state, the aberration becomes intensified sharply as the wave length varies in the neighborhood of these wave lengths. On the other hand, the lens of the present invention, shown in FIGS. 3 and 5, has such a great effect that the gentle slopes of the aberration curves in the neighborhood of 436 and 546 nm. lines permits to use rays of light having wave lengths in the regions of 405–436 and 546–578 nm. without intensifying the aberrations. Moreover, a wide range of usable wave lengths results in an increase of intensity of light which allows to perform the alignment under a bright field of view and to reduce the printing time. Further, in performing the alignment operation, there are such advantages that a bright image can be viewed, and even if the lines of the spectrum of a light source are diffused, a clear image can be viewed because of the same effect as the printing light.

Figure 6:
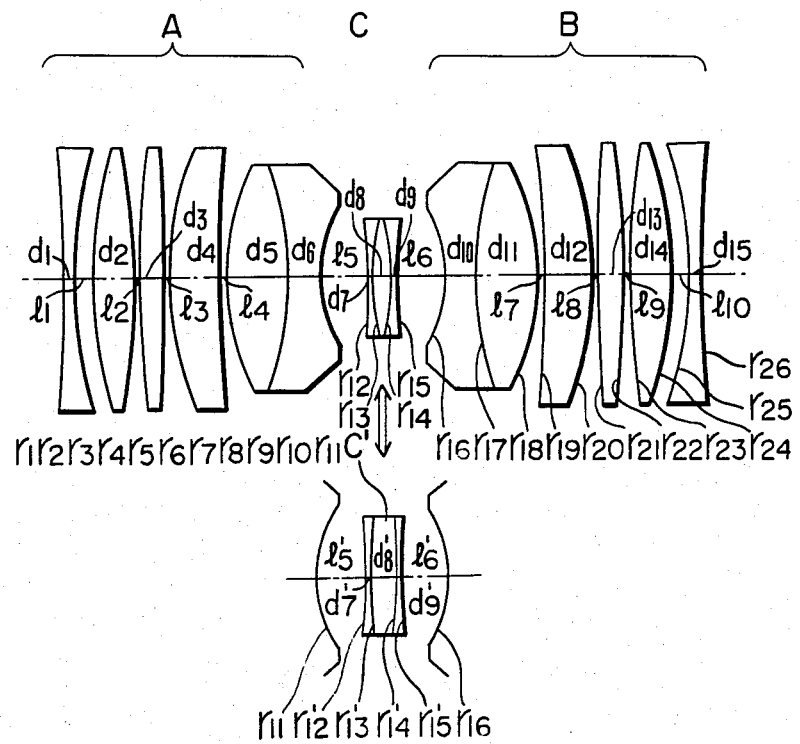
FIG. 6 is a diagram of one embodiment of the lenses of the present invention.
Figure 7A:
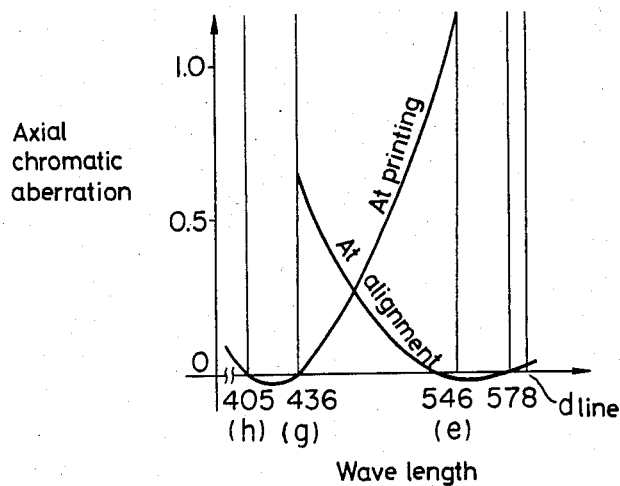
FIGS. 7a–7e are graphs illustrating states of correction of the aberrations of the above-mentioned embodiment.
Figure 7B:
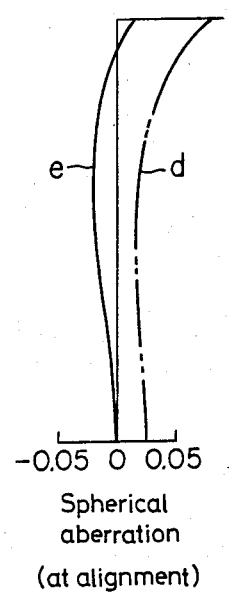
Figure 7C:
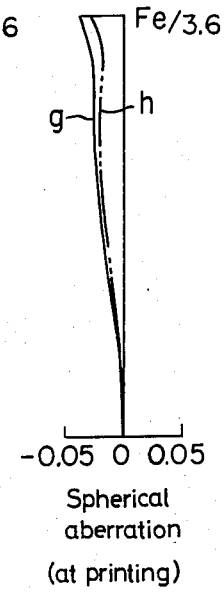
Figure 7D:
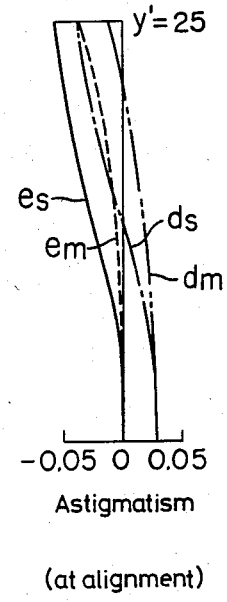
Figure 7E:

FIG. 6 is a diagram of a lens embodying the present invention. In this embodiment, the chromatic aberrations are corrected for four wave lengths 405, 436, 546 and 578 nm. in such manner that the concave lens (C) for the alignment and the concave lens for the printing, each located at the center, are constructed by cemented lens elements thereby the negative refractive power of lens (C) is weakened by making the radii of curvature of both sides of lens (C) larger than those of lens (C'), and the dispersion is equivalently controlled by making larger the radii of curvature of the cemented surfaces. The change in the astigmatism is made small by making the thickness of lens (C) less than that of lens (C').

The constructional data of the above-mentioned example are given in the following.

--- r: The radius of curvature of the lens refracting surfaces
d: The axial thickness of the lens elements
l: The axial air spacing of the lens elements
n: The refractive index (for d line) of the lens element glasses
ν: The Abbe number of the lens element glasses Focal length for e line $f_e = 173$
Image magnification $\beta = -1.0$
Effective F number $F_e = 3.6$

---

$r_1 = -797.301$
$\quad d_1 = 5.\ n_1 = 1.60342 \qquad \nu_1 = 38.0$
$r_2 = 146.811$
$\quad l_1 = 5.928$
$r_3 = 138.701$
$\quad d_2 = 13.\ n_2 = 1.67790 \qquad \nu_2 = 55.3$
$r_4 = -253.719$
$\quad l_2 = 0.12$
$r_5 = 295.785$
$\quad d_3 = 9.\ n_3 = 1.67790 \qquad \nu_3 = 55.3$ -Continued $r_6 = -1048.386$
$l_3 = 0.12$
$r_7 = 106.192$
$d_4 = 18.$  $n_4 = 1.63980$  $v_4 = 55.3$
$r_8 = 384.833$
$l_4 = 0.12$
$r_9 = 80.414$
$d_5 = 20.335$  $n_5 = 1.51633$  $v_5 = 64.1$
$r_{10} = -145.310$
$d_6 = 11.764$  $n_6 = 1.63930$  $v_6 = 44.9$
$r_{11} = 45.879$ For the alignment:
$l_5 = 15.855$
$r_{12} = -337.179$
$d_7 = 2.$  $n_7 = 1.63980$  $v_7 = 34.6$
$r_{13} = 87.582$
$d_8 = 6.$  $n_8 = 1.64850$  $v_8 = 53.0$
$r_{14} = -87.582$
$d_9 = 2.$  $n_9 = 1.63980$  $v_9 = 34.6$
$r_{15} = 337.179$
$l_6 = 15.855$ For the printing:
$l_5' = 14.855$
$r_{12}' = -344.969$
$d_7' = 2.$  $n_7' = 1.63980$  $v_7' = 34.6$
$r_{13}' = 826.337$
$d_8' = 8.$  $n_8' = 1.64850$  $v_8' = 53.0$
$r_{14}' = -826.337$
$d_9' = 2.$  $n_9' = 1.63980$  $v_9' = 34.6$
$r_{15}' = 344.969$
$l_6' = 14.855$ $r_{16} = -45.879$
$d_{10} = 11.764$  $n_{10} = 1.63930$  $v_{10} = 44.9$
$r_{17} = 145.310$
$d_{11} = 20.335$  $n_{11} = 1.51633$  $v_{11} = 64.1$
$r_{18} = -80.414$
$l_7 = 0.12$
$r_{19} = -384.833$
$d_{12} = 18.$  $n_{12} = 1.67790$  $v_{12} = 55.3$
$r_{20} = -106.192$
$l_8 = 0.12$
$r_{21} = 1048.386$
$d_{13} = 9.$  $n_{13} = 1.67790$  $v_{13} = 55.3$
$r_{22} = -295.785$
$l_9 = 0.12$
$r_{23} = 253.719$
$d_{14} = 13.$  $n_{14} = 1.67790$  $v_{14} = 55.3$
$r_{24} = -138.701$
$l_{10} = 5.928$
$r_{25} = -146.811$
$d_{15} = 5.$  $n_{15} = 1.60342$  $v_{15} = 38.0$
$r_{26} = 797.301$ The states of correction of the aberrations of the abovementioned example which occur at the time of the alignment and the printing are shown in FIGS. 7a-7e. The lens of this embodiment is of the perfect symmetry type, and the magnification of image is unity, so that there is by nature no lateral chromatic aberration.

What is claimed is:

1. A projection lens for mask pattern printing comprising a photographic lens arrangement which is interposed between an image plane and an object plane and used for both the alignment and the printing, and including at least one group of fixedly spaced lenses corrected for chromatic aberrations with respect to at least four wavelengths, and a pair of interchangeable lens elements which are interchangeably inserted into said arrangement at identical axial positions therein, one of said interchangeable lens elements being corrected for chromatic aberrations for at least two of said wavelengths and being designed for the alignment and inserted during alignment; the other of said interchangeable lens elements being corrected for chromatic aberrations for at least the other two wavelengths and being designed for the printing and inserted during printing; the axial spacing between said photographic lens arrangement and the image plane remaining the same during both alignment and printing, and the axial spacing between the object plane and the image plane remaining the same during both alignment and printing.

2. The projection lens according to claim 1, which is constructed of a lens arrangement of the substantially symmetric type.

3. A projection lens according to claim 2, in which the interchangeable lens elements, which are interchanged between the alignment operation and the printing operation, are inserted substantially at the center of the projection lens.

4. The projection lens according to claim 3, in which each interchangeable lens element inserted substantially at the center of the projection lens is a concave lens element.

5. A projection lens according to claim 1, wherein said fixedly spaced lenses include a pair of meniscus lenses having their concave surfaces facing toward each other, and convergent lens elements disposed axially outwardly of said meniscus lenses; each interchangeable lens element being a concave lens insertable between the two meniscus lenses.

6. A projection lens according to claim 5, wherein said interchangeable concave lenses are double concave cemented lenses.

7. A mask pattern printing projection lens, corrected for chromatic aberration with respect to at least three wavelengths, comprising a photographic lens arrangement which is interposed between an image plane and an object plane and used for both the alignment and the printing, and including at least one group of fixedly spaced lenses and a pair of interchangeable lens elements which are interchangeable inserted into said photographic lens arrangement at identical axial positions therein, one of said interchangeable lens elements being inserted into said photographic lens arrangement during alignment, and the other lens element being inserted into said photographic lens arrangement during printing; the photographic lens arrangement, with said one lens element inserted therein, being corrected for chromatic aberration with respect to two of said wavelengths and being designed for the alignment; the photographic lens arrangement, with said other lens element inserted therein, being corrected for chromatic aberration with respect to another two of said wavelengths and designed for printing; the axial spacing between said photographic lens arrangement and the image plane remaining the same during both alignment and printing, and the axial spacing between the object plane and the image plane remaining the same during both alignment and printing.

* * * * *